United States Patent [19]

Hamm et al.

[11] Patent Number: 4,667,905
[45] Date of Patent: May 26, 1987

[54] HIGH STRENGTH TO WEIGHT HORIZONTAL AND VERTICAL AIRCRAFT STABILIZER

[75] Inventors: Robert A. Hamm, Bellevue, Wash.; Uri Soudak, Herzlia, Israel

[73] Assignee: The Boeing Company, Seattle, Wash.

[21] Appl. No.: 564,577

[22] PCT Filed: Sep. 29, 1983

[86] PCT No.: PCT/US83/01551
 § 371 Date: Sep. 29, 1983
 § 102(e) Date: Sep. 29, 1983

[87] PCT Pub. No.: WO85/01489
 PCT Pub. Date: Apr. 11, 1985

[51] Int. Cl.[4] .............................................. B64C 3/18
[52] U.S. Cl. ...................................... 244/123; 244/87
[58] Field of Search ................ 244/123, 124, 87, 35 R

[56] References Cited

U.S. PATENT DOCUMENTS

| | | | |
|---|---|---|---|
| 1,809,913 | 6/1931 | Semmes | 244/123 |
| 1,835,532 | 12/1931 | Semmes | 244/123 |
| 2,031,662 | 2/1936 | Mercier | 244/123 |
| 2,410,056 | 10/1946 | Fresco | 244/4 |
| 2,593,714 | 4/1952 | Robinson | 154/83 |
| 2,997,262 | 8/1961 | Kirk et al. | 244/123 |
| 2,998,947 | 9/1961 | Griffith | 244/117 |
| 3,109,614 | 11/1963 | Steidl | 244/87 |
| 3,436,038 | 4/1969 | Parsons et al. | 244/123 |
| 3,910,531 | 10/1975 | Leomand | 244/123 |

FOREIGN PATENT DOCUMENTS

| | | | |
|---|---|---|---|
| 337928 | 10/1933 | Fed. Rep. of Germany | 244/123 |
| 497275 | 12/1919 | France | 244/123 |
| 962428 | 6/1950 | France | 244/123 |
| 699070 | 10/1953 | United Kingdom | 244/123 |

Primary Examiner—Trygve M. Blix
Assistant Examiner—Rodney Corl
Attorney, Agent, or Firm—Eugene O. Heberer

[57] ABSTRACT

A minimum weight horizontal and vertical stabilizer (188) which a primary torque box is formed within the skins (202, 204) and extends transversely from the most forwardly spars (190, 212) to the most rearwardly spar (196) to occupy spaces between all of the spars (190, 212, 192, 194, 196).

25 Claims, 13 Drawing Figures

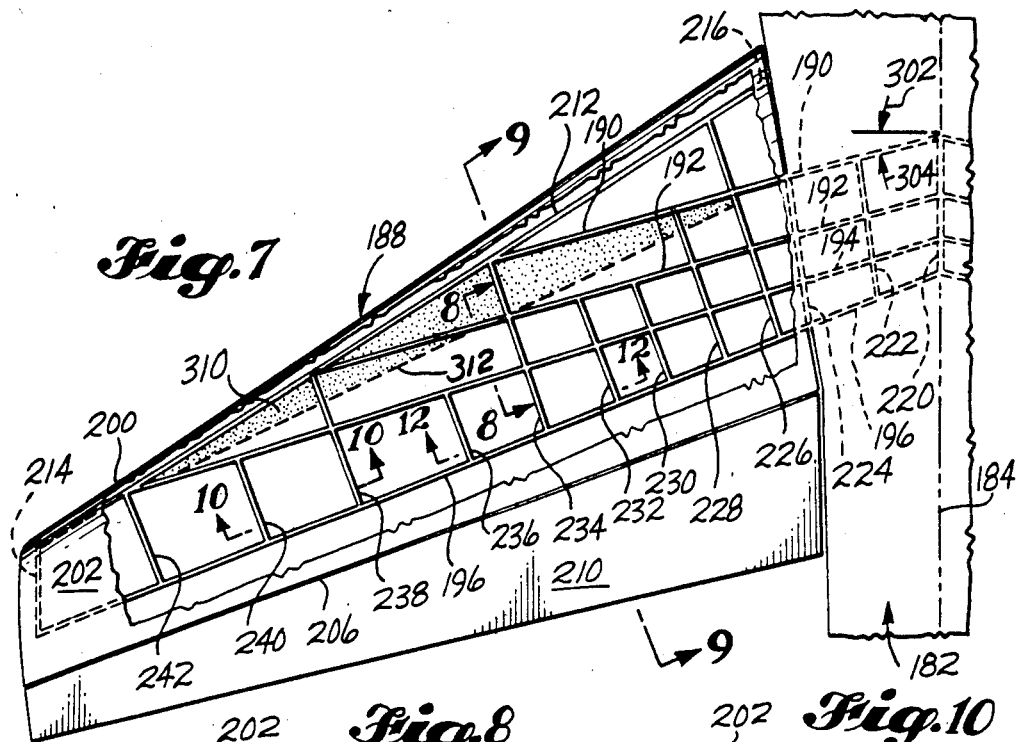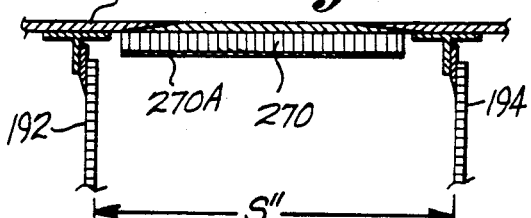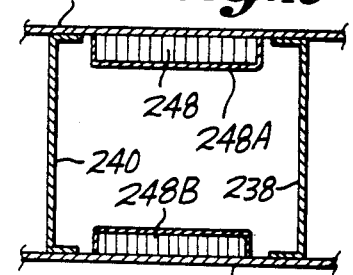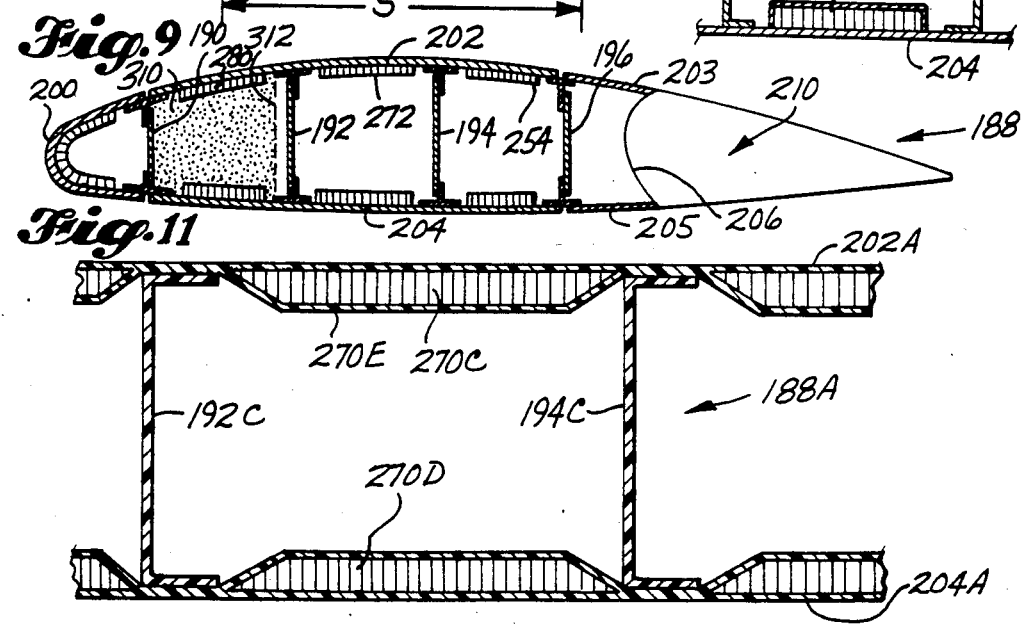

HIGH STRENGTH TO WEIGHT HORIZONTAL AND VERTICAL AIRCRAFT STABILIZER

DESCRIPTION

1. Technical Field

The invention relates to a horizontal and vertical stabilizer for use as a part of an empennage.

2. Background Art

One type of conventional vertical or horizontal stabilizer for large aircraft is comprised of three spars and many ribs and stringers. The primary bending loads are carried by stressed skins, and stringers inside thereof, in an after torque box, spaced fore and aft between a front spar and a rear spar. The ribs, extending fore and aft, stabilize the skin and stringers to prevent buckling and provide load paths for concentrated transverse loads such as horizontal stabilizer pivot and elevator hinges.

This structure is fail-safe, designed for a two bay crack; that is, it stops cracks along the skins in the fore and aft direction between three stringers, which typically comprise a distance of about ten inches. The foregoing type of stabilizer has the disadvantages of being relatively heavy because of the substantial number of stringers required and of the inefficiency of buckling skin between stringers.

A minimum weight design for horizontal and vertical stabilizer structures has been obtained with the use of honeycomb sandwich construction in which the skin is 100% non-buckling. One type of sandwich is made of aluminum inner and outer skins and an aluminun honeycomb core and another type has been made with graphite epoxy skins and a non-metal core. These honeycomb sandwiches are used to eliminate the stringers and some of the ribs. However, where the stringers are eliminated, the structural arrangement requires the addition of two intermediate spars, between the front and rear spars, solely for fail-safe design to act as crack stoppers in the outer stabilizer skins. In this arrangement the length of the crack size is somewhat greater than in the conventional stabilizer using stringers, as referred to above. However, the two additional intermediate spars have been found to take away much of the weight savings provided by the honeycomb structure used between the ribs and spars.

A search of the patent literature illustrates other airfoil support structures. For example, U.S. Pat. No. 1,809,913 discloses an airplane wing employing a plurality of spars arranged in a fan-like shape in conjunction with ribs arranged at varying distances from each other. These spars are positioned at varying distances from each other along the transverse axis of the airfoil and the ribs are positioned at varying distances along the longitudinal axis of the airfoil. The outer ends of the spars are secured to the leading and trailing edges, the tip, and the ribs of the airfoil, whereas the inner ends of the spars are secured to the root portion of the fan. This construction allows the spars to be grouped in proximity within the zone of center pressure travel, and permits the trailing edge, weakened by the cut out portion for the aileron to be suitably supported and strengthened by the spars shown at 12b.

The arrangement allows the ribs 13a, adjacent the path of the lateral center pressure travel, to be grouped in proximity to each other thus adding strengthening qualities to the airfoil along the lateral position of the resultant lift load. A grouping of the ribs may be employed close to the root portion 11 as shown by the ribs 13b so that the wing may be adequately supported from the fuselage.

French Pat. No. 962,428 shows spars fanning outwardly and trailing rearwardly so that some of the spars terminate in the outboard end of an airfoil and other of the spars tend to terminate adjacent the trailing edge of the airfoil. The ribs extend across the airfoil and are slightly varied in spacing and the spaces slightly increase outboardly.

U.S. Pat. No. 3,436,038, shows spars, FIG. 5, extending from a support point A. Some of the spars extend forwardly to a leading edge 60 and other of the spars extend outboardly to an end rib. The spacing of the ribs is varied, decreasing outboardly.

The following patents disclose various airfoil structures: U.S. Pat. No. 2,410,056, U.S. Pat. No. 2,593,714, U.S. Pat. No. 2,998,947, and French Pat. No. 497,275.

DISCLOSURE OF THE INVENTION

The invention is a high strength to weight horizontal and vertical stabilizer structure for use with an empennage and the combination thereof. The structure includes the use of honeycomb sandwiches which may be used in metallic structures or composite structures. The stabilizer is made without stringers, and the front and intermediate spars, the latter replacing the stringers, are swept forwardly to minimize their lengths, and therefore, their weight.

The arrangement of the intermediate spars, rear spar and front spar along with an auxiliary spar provide a fail-safe structure but the total spar weight is reduced considerably in comparison with the structure discussed above, in which the stringers had been eliminated.

The front spar, extending outwardly from the tail section of an aircraft, joins an auxiliary spar and together they form a leading edge of a primary torque box. The area formed just aft of the leading edge is more efficient in the present invention; that is, having a higher strength to weight ratio, because its forward area, now forming part of the primary torque box structure, has spars that carry through to the center line of the tail section. This is in contrast to the structure described above in which the auxiliary spar is not connected and dead ends, not extending into the tail section.

The reduced "sweep" angle of the present invention may reduce the "sweep effect" which tends to make the forward portion of the torque box less efficient. The overall effect of the present invention is to produce a minimum weight horizontal and vertical stabilizer structure which is fail-safe. The stressed inner skins and cores of the honeycomb sandwiches and dense cores are continuous outwardly of the ribs in the inboard and aft highly loaded areas of the stabilizer.

Cost savings produced by the present invention wherein the empennage has a horizontal and a vertical stabilizer, according to the invention, are in the range of 13% to 40%. Weight savings in the present invention are in the range of 13% to 28%.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 7 is a partially cut away plan view of a semispan of a horizontal stabilizer according to the invention, primarily illustrating the spars and ribs;

FIG. 8 is a cross-sectional view taken along the lines 8—8 in FIG. 7;

FIG. 9 is a cross-sectional view taken along the lines 9—9 in FIG. 7;

FIG. 10 is a cross-sectional view taken along the lines 10—10 in FIG. 7;

FIG. 11 is a fragmentary sectional view of the invention made from composite materials;

BEST MODE FOR CARRYING OUT THE INVENTION

Figure 1:
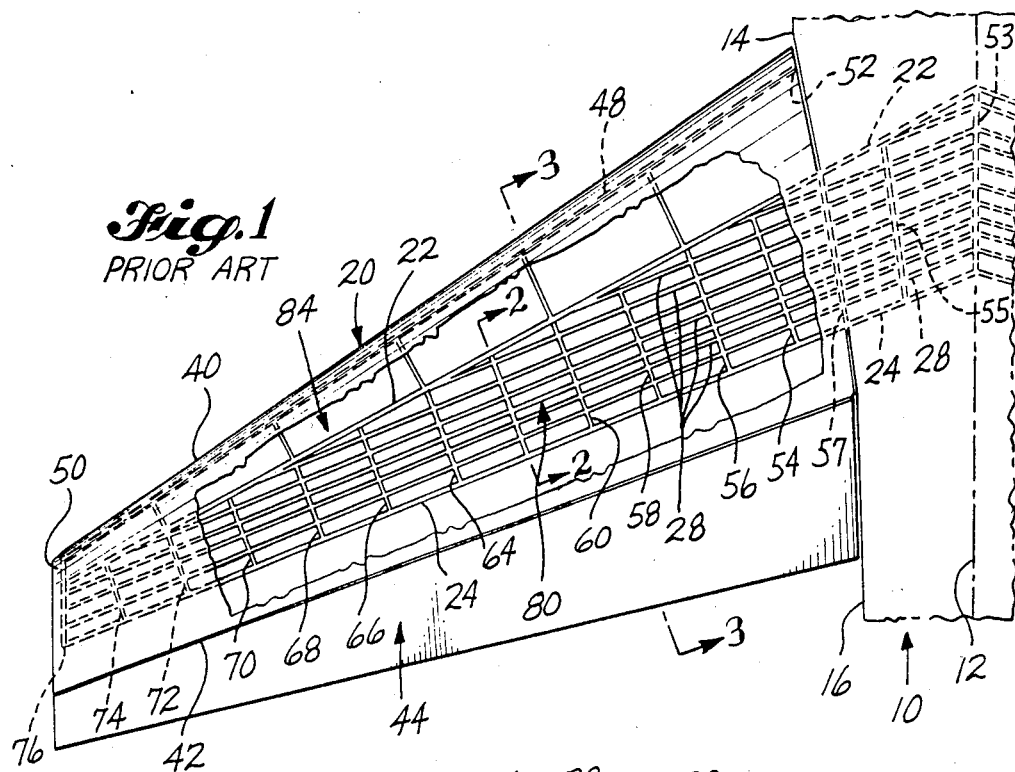
FIG. 1 is a partially cut away plan view of a semispan of a prior art horizontal stabilizer using stringers as skin crack stoppers.
Figure 2:
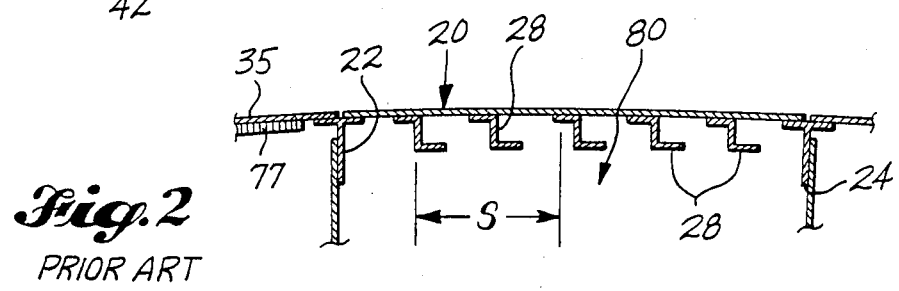
FIG. 2 is a cross-sectional view taken along the lines 2—2 in FIG. 1.
Figure 3:
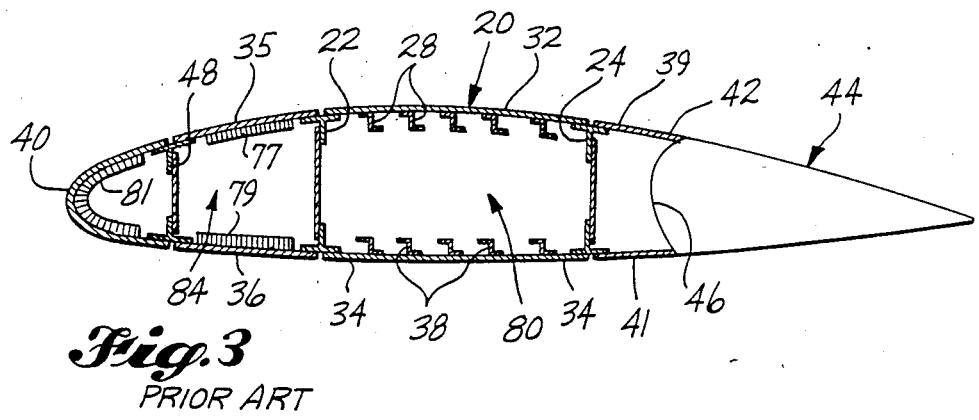
FIG. 3 is a cross-sectional view taken along the lines 3—3 in FIG. 1.

Referring again to the drawings, there is shown in FIGS. 1-3 a portion 10 of the tail section of an aircraft of which the center line is indicated as 12. The body of the tail section has an outboard edge 14 in plan at the forward end and the body narrows to an outboard edge 16 at the after end. A semispan 20 of a horizontal stabilizer extends outboardly from the tail section and is secured thereto by front and rear spars 22 and 24, respectively, and between the front and rear spars are a plurality of outboardly extending stringers 28, the stringers and spars 22 and 24 are secured within the tail section so as to support the horizontal stabilizer.

The stabilizer semispan 20 has an airfoil cross section, FIG. 3, and has upper ends of the spars 22 and 24 secured to an upper skin 32 and has lower ends of the spars 22 and 24 secured to a lower skin 34. The stringers 28 are also secured to the upper skin and a series of substantially identical stringers 38 are secured to the lower skin 34.

The skins 32 and 34 are joined to forward skins 35 and 36 and to leading end 40 and are joined to rear skins 39 and 41 which extend to a trailing end 42 to which an elevator 44 is hingedly engaged for upwardly and downwardly movement generally along a line 46, the hinge and supporting trailing ribs not being shown in detail. The skins 39 and 42 are spaced at the end 42.

At the leading end of the stabilizer there is an auxiliary spar 48, extending from an outboard end 50 to an inboard end 52, the auxiliary spar dead-ending outboardly of the tail section 10. Spaced along the longitudinal axis of the stabilizer are ribs 53, 55, 57, 54, 56, 58, 60, 62, 64, 66, 68, 70, 72, 74, and 76. Ribs extend generally fore and aft and vertically from the upper inside surface of the skin to the lower internal surface of the skin to which they are joined, and also joined to the spars and stringers. Ribs 56, 60, 64, 68, 72 and 74 extend forwardly of the front spar 22 and are joined to the auxiliary spar 48, FIG. 1.

The skins 35, 36 and the leading end 40 have honeycomb sandwiches 77, 79, and 81 bonded thereto.

The primary bending loads are carried by the stressed skins 32, 34, terminating fore and aft at the spars 22, 24, and the stringers 28, 38 inside of an aft torque box 80, extending between the upper and lower skins and the front and rear spars. The ribs stabilize the skin and stringers to prevent buckling and to provide load paths for concentrated transverse loads such as horizontal stabilizer pivoting and elevator operation. Horizontal stabilizers are provided with means for pivoting about the longitudinal axis, not shown.

The structure shown in FIGS. 1-3 is fail-safe. The stringers 28 and 38 perform as skin crack stoppers in the fore and aft direction, the design in FIG. 2 illustrating a two bay crack formed by the three stringers, having the space S therebetween, the space being equal to about ten inches.

Between the auxiliary spar 48 and the front spar 22, there is a forward torque box 84, which relative to the pivoting of the stabilizer, is inefficient in that it is located at the extreme forward edge of the stabilizer where the "sweep effect" is worst and the auxiliary spar is not fixed but is "pin-ended" at the tail section; also the skins are dead-ended at the side of the body.

Figures 4, 5, 6:
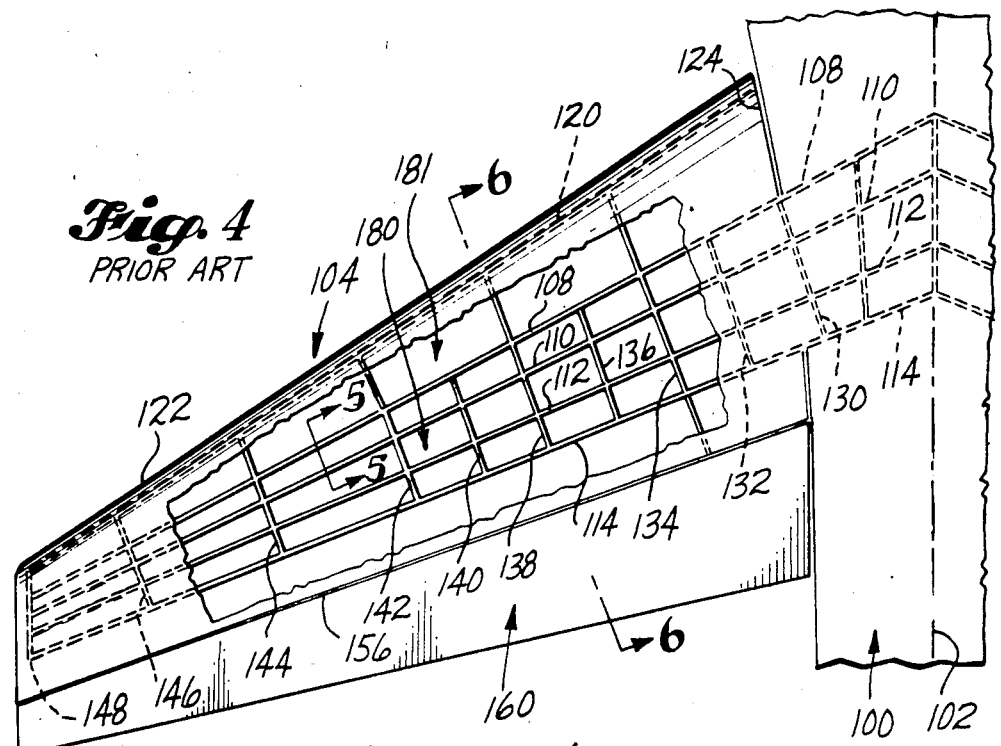
FIG. 4 is a plan view of a semispan of a prior art horizontal stabilizer in which stringers have been replaced by intermediate spars and honeycomb sandwiches.
FIG. 5 is a cross-sectional view taken along the lines 5—5 in FIG. 4.
FIG. 6 is a cross-sectional view taken along the lines 6—6 in FIG. 4.

FIGS. 4-6 illustrate a prior art minimum weight design for horizontal and vertical stabilizer structures. It should be noted that the horizontal and vertical stabilizers may be made having the same general structure. Here, an aircraft tail section 100 has a longitudinal center line 102. A semispan of a horizontal stabilizer 104 extends outboardly from the tail body section 100 and is secured therein by a front spar 108, two intermediate spars 110, 112, and a rear spar 114. The spars entend to the center line and are secured there and outboardly thereof. The other semispan, not shown, of the stabilizer extends outboardly to the right of the center line 102 and is supported on identical spars.

This design also includes an auxiliary spar 120, extending along and adjacent a leading edge 122 of the stabilizer. The auxiliary spar also dead ends outboardly of the tail section at 124.

Ribs 130, 132, 134, 136, 138, 140, 142, 144, 146, and 148 extend along upper and lower skins 150, 153, and 152, 154, joining the front, rear, and intermediate spars, and ribs 134, 138, 142, 144, 146, and 148 also join the auxiliary spar 120. At trailing end 156, where the skins 150 and 152 are spaced, an elevator 160 is hingedly connected.

This design omits the stringers, adding in their stead, the intermediate spars 110 and 112 and honeycomb sandwich structures 164, bonded to the upper and lower surfaces of the skins between the spars and between the ribs. The honeycomb structure may be entirely of aluminum, using the skin as the outer sandwich layer and having an inner, thinner aluminum snadwich layer 166 with honeycomb aluminum structure 170 therebetween, for example. Honeycomb sandwiches 172, 174 and 176 are also included.

As stated, the use of the honeycomb eliminates the stringers, FIG. 1, and some of the ribs. However, the use of a conventional structural arrangement, as shown in FIG. 4, required the addition of the two intermediate spars 110 and 112, solely for fail-safe design to act as crack stoppers, replacing the stringers in that respect. In this arrangement, FIG. 5, the crack size S' is larger than S in FIG. 2. The problem with the structure in FIGS. 4–6 is that the two additional intermediate spars take away much of the weight savings made possible with the honeycomb structure. In FIGS. 4–6 a primary torque box 180 is limited to the space between the front spar 108 and the rear spar 114 and the skins 150 and 152. The space between the spar 108 and the leading edge 122, including a forward torque box 181, has an inefficient structure with respect to strength to weight in that the spar 120 is pin-end supported at its inner end 124 and the skins are dead-ended.

The invention is shown in FIGS. 7–13 and while it is generally shown in the configuration as a semispan of a horizontal stabilizer, it illustrates the structure for the complete horizontal stabilizer and also for a vertical stabilizer, which is not shown. An aircraft tail section 182, shown in part, has a longitudinal center line 184. Secured within the tail section is a semispan of a horizontal stabilizer 188, having a front spar 190, intermediate spars 192, 194 and a rear spar 196. The spars are secured within the tail section and extend generally to the center line 184, from which extend identical spars of the other half of the horizontal stabilizer, not shown.

The stabilizer 188 has a leading edge 200, upper skins 202, 203 and lower skins 204, 205. The skins 203, 205 are supported by ribs at the trailing edges at 206 where an elevator 210 is hingedly engaged for upwardly and downwardly movement.

Extending along the leading edge is an auxiliary spar 212, FIG. 7, terminating outboardly at a rib 214 adjacent the outboard edge of the stabilizer. The auxiliary spar terminates inboardly at 216 externally of the tail section 182.

Ribs 220, 222, and 224 are connected to the four spars within the tail section so as to support the skins. Side-of-body rib 224 aids in supporting the stabilizer externally outboardly of the tail section. The ribs 226, 228, 230, 232, 234, 236, 238, 240, 242, and 214 are spaced along the longitudinal axis of the stabilizer, the space between the ribs being variable and generally increasing outboardly.

The spars 190, 192, 194, and 196 fan outboardly from the root supports in the tail section so that the front spar 190 and the two intermediate spars 192, 194 join the auxiliary spar 212 providing support and, fan forwardly and are shortened so as to lighten the weight.

Figure 12:
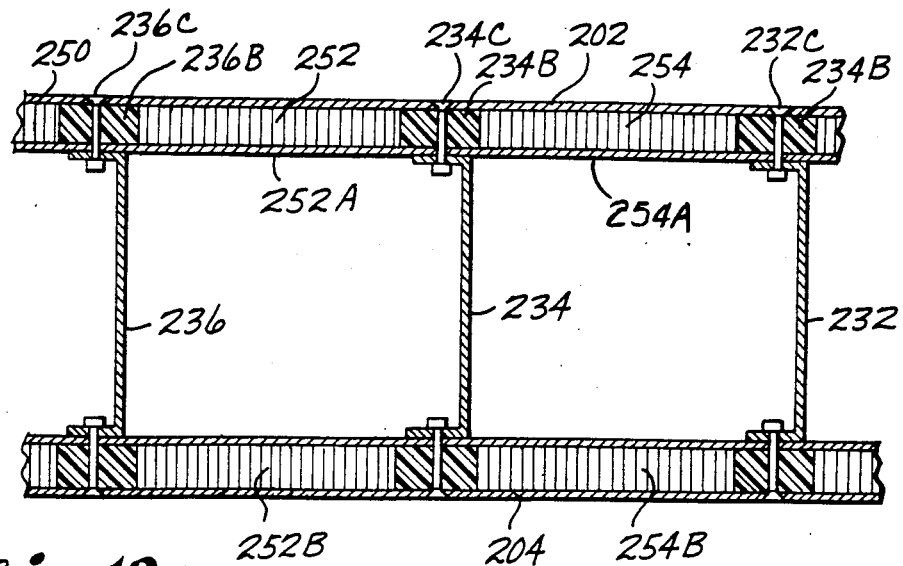
FIG. 12 is a cross-sectional view taken along the lines 12—12 in FIG. 7.
Figure 13:
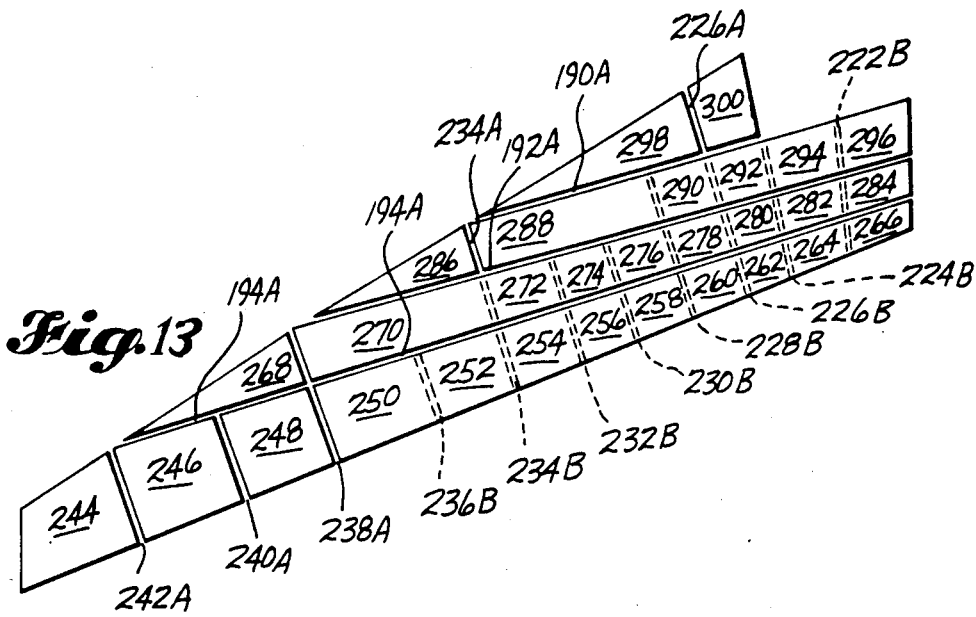
FIG. 13 is a cut away plan view of the stabilizer in FIG. 7, illustrating the inner skin and honeycomb sandwich core map.

With the use of honeycomb sandwiches between the spars and between the ribs, as shown in FIGS. 8–10, 12 and 13, and the shortened spars and reduced number of ribs, a minimum weight fail-safe stabilizer, according to the invention is provided. In FIG. 13 there is shown an inner skin and honeycomb sandwich core map, having the outer skin removed. This map can be read along with FIG. 7 which does not indicate the core arrangement. The inner skin and cores, including dense or potted cores, are continuous vertically outwardly of the ribs in the inboard and aft highly loaded areas. Thus, in FIGS. 7 and 13 between the spars 194 and 196, there is a continuous inner skin, as 252A and 254A, FIG. 12, and regular honeycomb cores 250, 252, 254, 256, 258, 260, 262, 264, and 266, which are respectively joined by dense or potted cores 236B, 234B, 232B, FIG. 12, dotted lines in FIG. 13, 230B, 228B, 226B, 224B, and 222B.

As shown in FIG. 12 between the continuous core arrangement, and specifically between the dense or potted cores, extend the ribs 236, 234, and 232. Inboardly of the lower outer skin 204, a similar arrangement exists with a regular honeycomb core 252B and 254B spaced by dense or potted cores at the lower ends of the channel shaped ribs. The dense or potted cores permit the installation of mechanical fasteners 236C, 234C, and 232C in the upper skin combination and similar fasteners extend through the lower skin to secure the skins, ribs and cores together. The potted or dense cores are provided for taking mechanical fastener clamp-up forces.

In this arrangement the ribs extend between the inner skins whereas the spars extend so as to be directly connected to the outer skins as shown in FIG. 8. In FIG. 13 the spaces in which the spars extend are indicated as 194A, 192A, and 190A. Inner skin and cores are indicated at 270, 272, 274, 276, 278, 280, 282, and 284. A third row of continuous inner skin and cores are indicated at 288, 290, 292, 294, and 296.

The remainder of the cores and inner skins are individually terminated at the respective ribs and spars. These individual cores and inner skins are indicated at 244, 246, 248, 268, 286, 298, and 300. The rib spaces between the individual cores and skins are indicated at 242A, 240A, 238A, 234A, and 226A. Thus, in FIG. 8, core 270 between the spars 192 and 194 has a continuous inboardly extending inner skin 270A. The skin 270A extends, FIG. 13, under the cores inboardly from 270 through 284.

In FIG. 10 an interrupted lightweight (regular) core 248 is secured to the outer skin 202 and a similar core 248B is secured to the lower skin 204, the inner skins being designated as 248A.

With the structure shown in FIG. 7 wherein the spars are shortened the front spar 190 is swept forwardly so as to reduce a typical sweep angle between the arrows 302 and 304. This is in contrast to the larger sweep angles in FIGS. 1 and 4.

The fail-safe criteria of FIG. 4 is established in the arrangement in the invention in FIG. 7 but the total spar weight is reduced considerably. The stippled area 310 bounded by the front spar 190, the auxiliary spar 212 and the broken line 312, within the skins 202 and 204, forms a new part of the primary torque box structure with spars 190, 192 and 194 which carry through to the center line 184 for support. This makes the stippled area 310 an efficient high strength to weight area and forms part of the total torque box which extends between the skins and between the spars, except for that part of the spar 212 inboardly of where it joins the spar 190. This structure is in contrast to that in FIG. 4 where the auxiliary spar provides inadequate support because it pin ends at 124, and the skin dead ends, so that they cannot take bending loads.

The reduced sweep angle in FIG. 7 may reduce the "sweep effect", which in the prior art structures make the forward portion of the torque box less efficient as a high strength to weight ratio structure. The overall effect of the present invention is to produce a minimum weight structure that is advantageous in a horizontal and vertical high strength to weight stabilizer.

FIG. 11 is an illustration of the use of composite material in a stabilizer 188A which has the same general configuration as 188 in FIG. 7. The stabilizer here has skins at 202A and 204A comprised of graphite epoxy material. Intermediate spars 192C and 194C are in channel form and are also made of graphite epoxy. Extending between the spars and bonded to the skins are honeycomb structures 270C and 270D. The outer portions of the sandwich formed by the stabilizer skins and the inner plate portions are formed of an inner skin, as 270E, all of graphite epoxy material. The honeycomb core is formed of stiff nylon paper or fiberglass of adequate strength to carry the load. Such a structure made of composite materials is fail-safe in the same manner as that shown in FIG. 7.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

What is claimed is:

1. A fail-safe, high strength to weight aircraft stabilizer, comprising:
    an airfoil body having spaced outer skins;
    said spaced outer skins being connected to and longitudinally supported by inboardly and outboardly extending spars;
    one of said spars being an auxiliary most forwardly spar extending adjacent, along, and inwardly of a leading end of the stabilizer;
    a plurality of said spars extending inboardly beyond the stabilizer so as to be adapted to extend to a fore and aft centerline of the aircraft, and trailing outboardly, forming a forwardly extending fan formation and being shortened to terminate in and join said auxiliary spar adjacent said leading end; and
    a last rear spar extending beyond the stabilizer inboardly so as to be adapted to extend to a fore and aft centerline of the aircraft and trailing outboardly to adjacent an outer end of the stabilizer and in a direction toward the auxiliary spar.

2. The invention according to claim 1 in which:
    a primary torque box is formed in the stabilizer within the skins and extending transversely from the most forwardly spars to the most rearwardly spars to occupy spaces between all the spars.

3. The invention according to claim 1 in which:
    said auxiliary spar starts at and trails from adjacent an inner end of the stabilizer to adjacent an outer end.

4. The invention according to claim 1 including:
    honeycomb structures formed as sandwiches with inner faces of the outer skins and outer faces of inner skins of the stabilizer.

5. The invention according to claim 4 including:
    spaced ribs extending between inner faces of the inner skins and supporting the inner and outer skins transversely in the fore and aft directions;
    the spaces between said ribs being variable and generally increasing in the outboard direction.

6. The invention according to claim 2 in which:
    the auxiliary spar trails outboardly to a front spar of said plurality of spars;
    said front spar and auxiliary spar being joined and forming forward portions of the primary torque box.

7. The invention according to claim 6 in which:
    said auxiliary spar extends inboardly beyond the joint with the front spar and is formed to terminate outboardly of the aircraft empennage.

8. The invention according to claim 6 in which:
    said plurality of spars other than said front spar join the auxiliary spar outboardly of said front spar.

9. The invention according to claim 8 in which:
    said rear spar extends outboardly of the plurality of spars and of the auxiliary spar;
    the rear spar being spaced increasingly away from the plurality of spars as it extends outboardly and extends outboardly increasingly toward the auxiliary spar.

10. The invention according to claim 1 in which:
    said plurality of spars being intermediate said auxiliary spar and said rear spar;
    said rear spar fanning outboardly away from and relative to said plurality of spars.

11. The invention according to claim 5 in which:
    each of said plurality of spars being joined by a respective rib where the last spars join the auxiliary spar;
    said respective ribs each joining said rear spar.

12. The invention according to claim 9 in which:
    said plurality of spars include said front spar and first and second intermediate spars and each of which extend successively farther outboardly and rearwardly and being successively longer to terminate in the auxiliary spar;
    said intermediate spars extending rearwardly of said auxiliary and front spars, and forwardly of said rear spar to form transverse crack stoppers for a sufficient longitudinal length along the auxiliary spar, the front spar, and rear spar to make the stabilizer fail-safe.

13. In an aircraft, a fail-safe, high strength to weight stabilizer, comprising:
    an airfoil body having spaced outer skins being connected to and longitudinally supported by inboardly and outboardly extending spars;
    one of said spars being an auxiliary most forwardly spar extending adjacent, along, and inwardly of a leading end of the stabilizer;
    a plurality of said spars extending inboardly beyond the stabilizer into the aircraft to a fore and aft centerline thereof for supportive connection therein, said plurality of spars trailing outboardly in the stabilizer, forming a forwardly extending fan formation and being shortened to terminate in and join said auxiliary spar adjacent said leading end; and
    a last rear spar entending beyond the stabilizer inboardly into the aircraft to a fore and aft centerline thereof for supportive connection in the aircraft, and trailing outboardly in the stabilizer adjacent an outer end of the stabilizer and in a direction toward the auxiliary spar.

14. The invention according to claim 13 in which:
    a primary torque box is formed in the stabilizer within the skins and extending transversely from the most forwardly spars to the most rearwardly spars to occupy spaces between all of the spars.

15. The invention according to claim 13 in which:
    said auxiliary spar starts at and trails from adjacent an inner end of the stabilizer outboardly of the aircraft to an adjacent outer end of the stabilizer.

16. The invention according to claim 13 including:
    honeycomb structures formed as sandwiches with inner faces of the outer skins and outer faces of inner skins of the stabilizer.

17. The invention according to claim 16 including:

spaced ribs extending between inner faces of the inner skins and supporting the inner and outer skins transversely in the fore and aft directions;

the spaces between said ribs being variable and generally increasing in the outboard direction.

18. The invention according to claim 17 in which:

the auxiliary spar trails outboardly to a front spar of said plurality of spars;

said front spar and auxiliary spar being joined and forming forward portions of the primary torque box.

19. The invention according to claim 18 in which:

said auxiliary spar extends inboardly beyond the joint with the front spar and is formed to terminate outboardly of the aircraft empennage.

20. The invention according to claim 18 in which:

said plurality of spars other than said front spar join the auxiliary spar outboardly of said front spar.

21. The invention according to claim 20 in which:

said rear spar extends outboardly of the plurality of spars and of the auxiliary spar;

the rear spar being spaced increasingly away from the plurality of spars as it extends outboardly and extends outboardly increasingly toward the auxiliary spar.

22. The invention according to claim 13 in which:

said plurality of spars being intermediate said auxiliary spar and said rear spar;

said rear spar fanning outboardly away from and relative to said plurality of spars.

23. The invention according to claim 16 in which:

each of said plurality of spars being joined by a respective rib where the last spars join the auxiliary spar;

said respective ribs each joining said rear spar.

24. The invention according to claim 20 in which:

said plurality of spars include said front spar and first and second intermediate spars and each of which extends successively farther outboardly and rearwardly and being successively longer to terminate in the auxiliary spar;

said intermediate spars extending rearwardly of said auxiliary and front spars, and forwardly of said rear spar to form transverse crack stoppers for a sufficient longitudinal length along the auxiliary spar, the front spar, and rear spar to make the stabilizer fail-safe.

25. The invention according to claim 18 in which:

a second spar of said plurality of spars is aft of said front spar and joins said auxiliary spar outboardly of said front spar;

honeycomb cores being between inner faces of the outer skins and outer faces of inner skins of the stabilizer and extending between the spars;

the inner skins being continuous and the cores being substantially continuous between the ribs and outwardly thereof in highly loaded areas of the stabilizer inboardly of the outboard end of the second spar, and between the first spar and the rear spar, and between the second spar and the rear spar.

* * * * *